(12) United States Patent
Iwasaki

(10) Patent No.: US 11,456,897 B2
(45) Date of Patent: Sep. 27, 2022

(54) COMMUNICATION APPARATUS, METHOD, PROGRAM, AND RECORDING MEDIUM

(71) Applicant: NEC CORPORATION, Tokyo (JP)

(72) Inventor: Motoya Iwasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 168 days.

(21) Appl. No.: 17/042,448

(22) PCT Filed: Jan. 10, 2019

(86) PCT No.: PCT/JP2019/000508
§ 371 (c)(1),
(2) Date: Sep. 28, 2020

(87) PCT Pub. No.: WO2019/198282
PCT Pub. Date: Oct. 17, 2019

(65) Prior Publication Data
US 2021/0083905 A1 Mar. 18, 2021

(30) Foreign Application Priority Data
Apr. 9, 2018 (JP) .............................. JP2018-074406

(51) Int. Cl.
*H04L 25/02* (2006.01)
*H04L 5/26* (2006.01)
(Continued)

(52) U.S. Cl.
CPC ....... *H04L 25/0228* (2013.01); *H04B 7/0413* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 9,325,451 B1 * | 4/2016 | Kerhuel | ............ H04L 25/03286 |
| 2010/0183102 A1 * | 7/2010 | Mukai | ................... H04L 1/0048 375/346 |

(Continued)

FOREIGN PATENT DOCUMENTS

| | | |
|---|---|---|
| JP | 2014-127876 A | 7/2014 |
| JP | 2017-38189 A | 2/2017 |

(Continued)

OTHER PUBLICATIONS

Atsushi Ohta et al., "High Efficient Spatial Division Multiplexing Technique with the First Eigen-mode parallel transmission on millimeter wave band in LOS environment—Basic Concept and Its Performance Evaluation-", IEICE Technical Report, RCS2015-144, Aug. 10, 2015, pp. 73-78, vol. 115, No. 181.

(Continued)

*Primary Examiner* — Duc T Duong
(74) *Attorney, Agent, or Firm* — Sughrue Mion, PLLC

(57) ABSTRACT

A communication apparatus 300 includes a first channel estimating unit 131 configured to perform a first channel estimation at a first frequency using a reference signal included in a signal sequence, a first weight information generating unit 133 configured to generate first weight information based on the first channel estimation, a synthesis processing unit 135 configured to perform weighted synthesis processing based on the first weight information, a second channel estimating unit 137 configured to perform a second channel estimation at a second frequency higher than the first frequency using a reference signal included in the signal sequence subjected to the weighted synthesis processing, a second weight information generating unit 139 configured to generate second weight information based on the second channel estimation, and a demodulation processing unit 141 configured to perform demodulation processing of the signal sequence subjected to the weighted synthesis processing based on the second weight information.

9 Claims, 7 Drawing Sheets

(51) Int. Cl.
*H04B 7/0413* (2017.01)
*H04L 5/00* (2006.01)

(56) References Cited

U.S. PATENT DOCUMENTS

| | | | | |
|---|---|---|---|---|
| 2012/0076238 A1* | 3/2012 | Catreux | ............... | H04B 7/0626 375/299 |
| 2013/0100920 A1* | 4/2013 | Nakamura | ............ | H04L 5/0035 370/329 |
| 2013/0266100 A1* | 10/2013 | Gomadam | ........ | H04L 25/03159 375/346 |
| 2015/0124909 A1* | 5/2015 | Sahara | ................. | H04B 7/0413 375/340 |
| 2016/0021663 A1* | 1/2016 | Takahashi | ............. | H04L 1/0041 370/329 |
| 2017/0288831 A1* | 10/2017 | Cezanne | ............ | H04L 27/2613 |
| 2019/0132157 A1* | 5/2019 | Hosseini | ............. | H04L 25/0262 |
| 2019/0165826 A1* | 5/2019 | Goto | ...................... | H04L 1/0003 |
| 2019/0349042 A1* | 11/2019 | Ramireddy | .......... | H04B 7/0473 |
| 2020/0119785 A1* | 4/2020 | Varatharaajan | ...... | H04B 7/0478 |
| 2020/0177249 A1* | 6/2020 | Ramireddy | .......... | H04B 7/0417 |

FOREIGN PATENT DOCUMENTS

| | | |
|---|---|---|
| JP | 2017-038193 A | 2/2017 |
| JP | 2018-19380 A | 2/2018 |

OTHER PUBLICATIONS

International Search Report for PCT/JP2019/000508, dated Mar. 12, 2019.
English translation of Written opinion for PCT Application No. PCT/JP2019/000508, dated Mar. 12, 2019.

* cited by examiner

COMMUNICATION APPARATUS, METHOD, PROGRAM, AND RECORDING MEDIUM

CROSS REFERENCE TO RELATED APPLICATIONS

This application is a National Stage of International Application No. PCT/JP2019/000508 filed Jan. 10, 2019, claiming priority based on Japanese Patent Application No. 2018-074406 filed Apr. 9, 2018, the entire disclosure of which is incorporated herein.

BACKGROUND

Technical Field

The present invention relates to a communication apparatus, a method, a program, and a recording medium.

Background Art

It is desired for Long Term Evolution (LTE) systems, which are fourth-generation mobile communication systems, and New Radio (NR) systems, which are fifth-generation mobile communication systems, to achieve broadbandization of a frequency bandwidth and use a signal spatial multiplexing scheme, for the purpose of adopting to a rapidly advancing increase in transmission rate.

To achieve broadbandization of a frequency bandwidth, the use of a high radio frequency band, such as a millimeter waveband, is effective. However, an increase in radio frequency increases propagation loss of radio signals. Hence, it is considered to be common to employ a method of narrowing propagation spread of radio waves by beamforming using a multi-element antenna, to thereby increase a power density. Also in a case of performing spatial multiplexing, a scheme of increasing the multiplicity by using a multi-element antenna is considered as a leading scheme. As seen from above, an increase in speed using a multi-element antenna is expected.

Since a signal received by a multi-element antenna is subjected to fading in spatial propagation and phase variation due to a frequency error and phase noise in a transmitter/receiver, it is necessary to correct these kinds of variation through demodulation processing.

For example, PTL 1 describes to perform signal separation by using virtual transmission paths corresponding to a first singular value while canceling, in two stages, residual interference still remaining between signal series.

PTL 2 describes that multiplication of a transmission/reception weight is performed in two stages in each of both a transmission side and a reception side and that one of the stages uses an averaging transmission/reception weight vector that allows an error due to channel time variation, while a matrix operation for suppression of interference with channel time variation only uses an operation of a real-time transmission/reception weight matrix of L*L size for signal sequences of L systems to be spatial multiplexed.

CITATION LIST

Patent Literature

[PTL 1] JP 2017-38193 A
[PTL 2] JP 2014-127876 A

SUMMARY

Technical Problem

However, when a multi-element antenna as that described above is used, the number of elements increases, and this may cause a concern for an increase in circuit scale.

To suppress such an increase in circuit scale, for example, analog beamforming is considered in which a signal is separated in a radio frequency band and the phase of each signal is controlled by an analog circuit to form a beam. However, there is a restriction that only the phase of each signal can be controlled, and this leads to a problem that the accuracy and the degree of freedom of beamforming are significantly limited.

Digital beamforming, in which a beam is formed through digital signal processing in a baseband section, is advantageous in that a beam can be controlled at a higher degree of freedom. However, in a reception demodulation circuit with signal processing requiring a large processing amount, the number of signal sequences to be subjected to the processing is extremely large. Hence, especially a case, for example, where a spatially multiplexed signal is received in multiple input multiple output (MIMO) from a terminal, requires a huge circuit scale, and this increases cost and power consumption to cause a problem in terms of realizability.

An example object of the present invention is to provide a communication apparatus, a method, a program, and a recording medium that can efficiently demodulate a spatially multiplexed signal sequence while attempting a reduction in circuit scale.

Solution to Problem

A communication apparatus according to an example aspect of the present invention includes a first channel estimating unit configured to perform a first channel estimation at a first frequency using a reference signal included in a spatially multiplexed and transmitted signal sequence, a first weight information generating unit configured to generate first weight information based on the first channel estimation, a synthesis processing unit configured to perform weighted synthesis processing on the signal sequence based on the first weight information, a second channel estimating unit configured to perform a second channel estimation at a second frequency higher than the first frequency using a reference signal included in the signal sequence subjected to the weighted synthesis processing, a second weight information generating unit configured to generate second weight information based on the second channel estimation, and a demodulation processing unit configured to perform demodulation processing of the signal sequence subjected to the weighted synthesis processing based on the second weight information.

A method according to an example aspect of the present invention includes performing a first channel estimation at a first frequency using a reference signal included in a spatially multiplexed and transmitted signal sequence, generating first weight information based on the first channel estimation, performing weighted synthesis processing on the signal sequence based on the first weight information, performing a second channel estimation at a second frequency higher than the first frequency using a reference signal included in the signal sequence subjected to the weighted synthesis processing, generating second weight information based on the second channel estimation, and performing demodulation processing of the signal sequence subjected to the weighted synthesis processing based on the second weight information.

A program according to an example aspect of the present invention causes a processor to execute performing a first channel estimation at a first frequency using a reference signal included in a spatially multiplexed and transmitted signal sequence, generating first weight information based on the first channel estimation, performing weighted synthesis processing on the signal sequence based on the first weight information, performing a second channel estimation at a second frequency higher than the first frequency using a reference signal included in the signal sequence subjected to the weighted synthesis processing, generating second weight information based on the second channel estimation, and performing demodulation processing of the signal sequence subjected to the weighted synthesis processing based on the second weight information.

A recording medium according to an example aspect of the present invention is a non-transitory computer readable recording medium storing a program that causes a processor to execute performing a first channel estimation at a first frequency using a reference signal included in a spatially multiplexed and transmitted signal sequence, generating first weight information based on the first channel estimation, performing weighted synthesis processing on the signal sequence based on the first weight information, performing a second channel estimation at a second frequency higher than the first frequency using a reference signal included in the signal sequence subjected to the weighted synthesis processing, generating second weight information based on the second channel estimation, and performing demodulation processing of the signal sequence subjected to the weighted synthesis processing based on the second weight information.

Advantageous Effects of Invention

According to an example aspect of the present invention, it is possible to efficiently demodulate a spatially multiplexed signal sequence while attempting a reduction in circuit scale. Note that, according to the present invention, instead of or together with the above effects, other effects may be exerted.

DESCRIPTION OF THE EXAMPLE EMBODIMENTS

Hereinafter, example embodiments of the present invention will be described in detail with reference to the accompanying drawings. Note that, in the Specification and drawings, elements to which the similar descriptions are applicable are denoted by the same reference signs, and overlapping descriptions may hence be omitted.

Descriptions will be given in the following order.
1. Overview of Example Embodiments of the Present Invention
2. Configuration of System
3. First Example Embodiment
3.1. Configuration of Base Station
3.2. Technical Features
3.3. Example
4. Second Example Embodiment
4.1. Configuration of Communication Apparatus
4.2. Technical Features
5. Other Example Embodiments 1. Overview of Example Embodiments of the Present Invention First, an overview of example embodiments of the present invention will be described.

(1) Technical Issues

It is desired for Long Term Evolution (LTE) systems, which are fourth-generation mobile communication systems, and New Radio (NR) systems, which are fifth-generation mobile communication systems, to achieve broadbandization of a frequency bandwidth and use a signal spatial multiplexing scheme, for the purpose of adopting to a rapidly advancing increase in transmission rate.

To achieve broadbandization of a frequency bandwidth, the use of a high radio frequency band, such as a millimeter waveband, is effective. However, an increase in radio frequency increases propagation loss of radio signals. Hence, it is considered to be common to employ a method of narrowing propagation spread of radio waves by beamforming using a multi-element antenna, to thereby increase a power density. Also in a case of performing spatial multiplexing, a scheme of increasing the multiplicity by using a multi-element antenna is considered as a leading scheme. As seen from above, an increase in speed using a multi-element antenna is expected.

Since a signal received by a multi-element antenna is subjected to fading in spatial propagation and phase variation due to a frequency error and phase noise in a transmitter/receiver, it is necessary to correct these kinds of variation through demodulation processing.

However, when a multi-element antenna as that described above is used, the number of elements increases to consequently increase the processing amount necessary for the above-described correction, and this may cause an increase in circuit scale.

Figure 1:
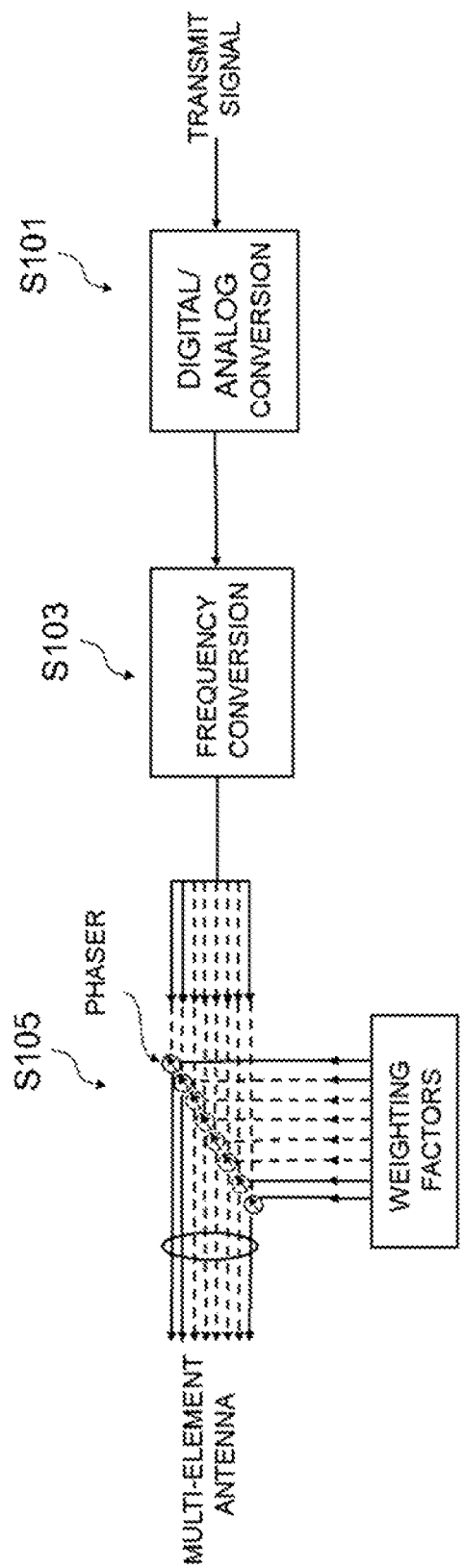
FIG. 1 is a diagram for schematically illustrating processing of transmitting a beam by using a multi-element antenna through analog beamforming.

For example, FIG. 1 is a diagram for schematically illustrating processing of transmitting a beam by using a multi-element antenna through analog beamforming. In FIG. 1, after performing digital/analog conversion processing S101 and frequency conversion S103 on a transmit signal, processing S105 of separating the resultant signal in a radio frequency band and controlling the phase of each signal by an analog circuit is performed, to thereby form a beam. However, in analog beamforming as that illustrated in FIG. 1, there is a restriction that only the phase of each signal can be controlled, and this leads to a problem that the accuracy and the degree of freedom of beamforming are significantly limited.

Figure 2:
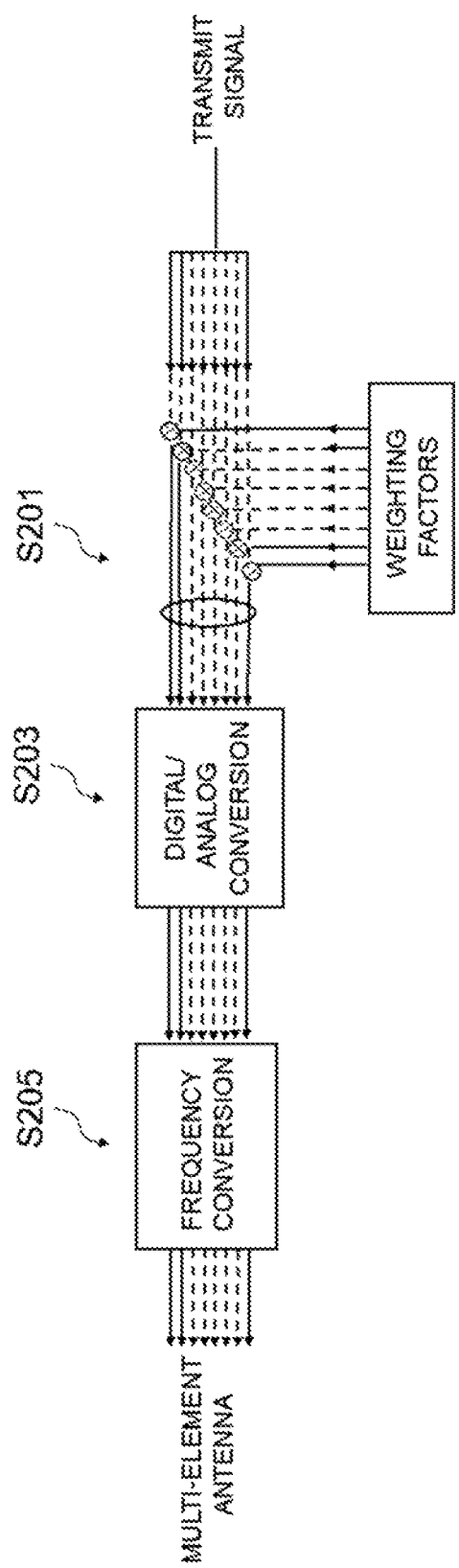
FIG. 2 is a diagram for schematically illustrating processing of transmitting a beam by using a multi-element antenna through digital beamforming.

For example, FIG. 2 is a diagram for schematically illustrating processing of transmitting a beam by using a multi-element antenna through digital beamforming. In FIG. 2, after a beam is formed through digital signal processing S201 in a baseband section, analog conversion processing S203 and frequency conversion S205 are performed. Such digital beamforming is advantageous in that a beam can be controlled at a higher degree of freedom.

In contrast, in a reception demodulation circuit, channel estimation, weighting factor generation, and weighted synthesis processing using weighting factors are performed on a received signal sequence, to thereby demodulate the signal sequence.

Figure 3:
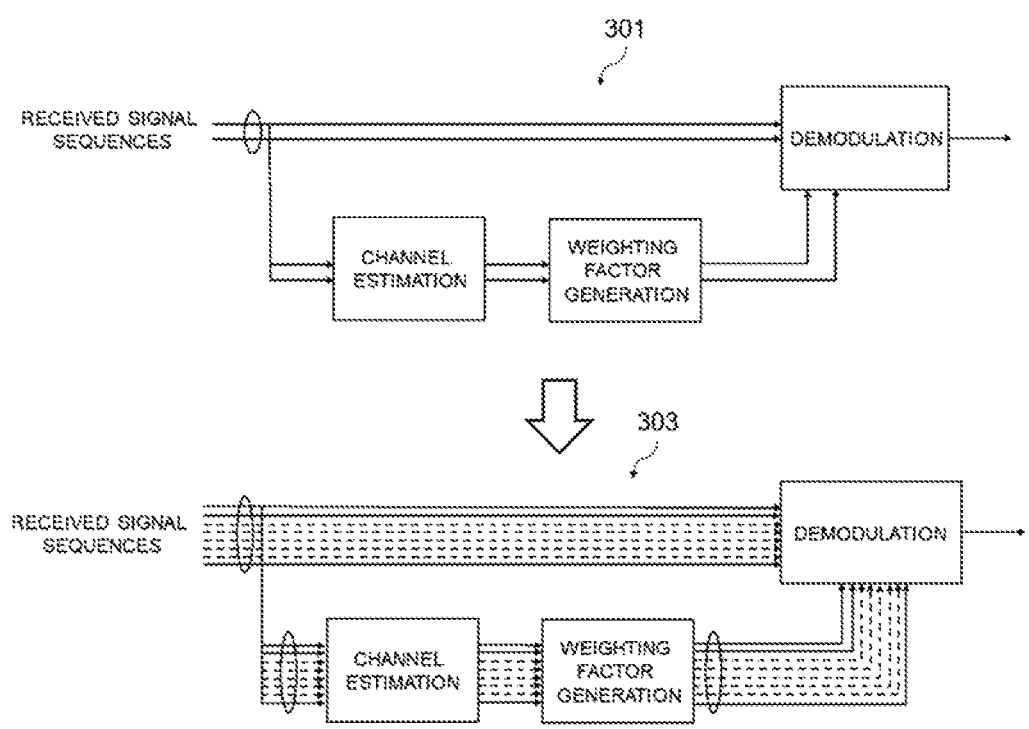
FIG. 3 is a diagram illustrating schematic configurations of two reception demodulation circuits 301 and 303 having different numbers of signal sequences.

However, in a reception demodulation circuit with signal processing requiring a large processing amount, the number of signal sequences to be subjected to the processing is extremely large. FIG. 3 is a diagram illustrating schematic configurations of two reception demodulation circuits 301 and 303 having different numbers of signal sequences. Hence, especially a case, for example, where a spatially multiplexed signal is received in multiple input multiple output (MIMO) from a terminal apparatus, requires a huge circuit scale, and this increases cost and power consumption to cause a problem in terms of realizability.

An example object of the present example embodiment is to provide a communication apparatus, a method, a program, and a recording medium that can efficiently demodulate a spatially multiplexed signal sequence while attempting a reduction in circuit scale.

(2) Technical Features

In example embodiments of the present invention, for example, a communication apparatus is configured to perform a first channel estimation at a first frequency using a reference signal included in a spatially multiplexed and transmitted signal sequence, generate first weight information based on the first channel estimation, perform weighted synthesis processing on the signal sequence based on the first weight information, perform a second channel estimation at a second frequency higher than the first frequency using a reference signal included in the signal sequence subjected to the weighted synthesis processing, generates second weight information based on the second channel estimation, and perform demodulation processing of the signal sequence subjected to the weighted synthesis processing based on the second weight information.

With this, it is possible, for example, to efficiently demodulate a spatially multiplexed signal sequence while attempting a reduction in circuit scale.

Note that the above-described technical features are concrete examples of the example embodiments of the present invention, and it is apparent that the present example embodiments of the present invention are not limited to the above-described technical features.

2. Configuration of System

Figure 4:
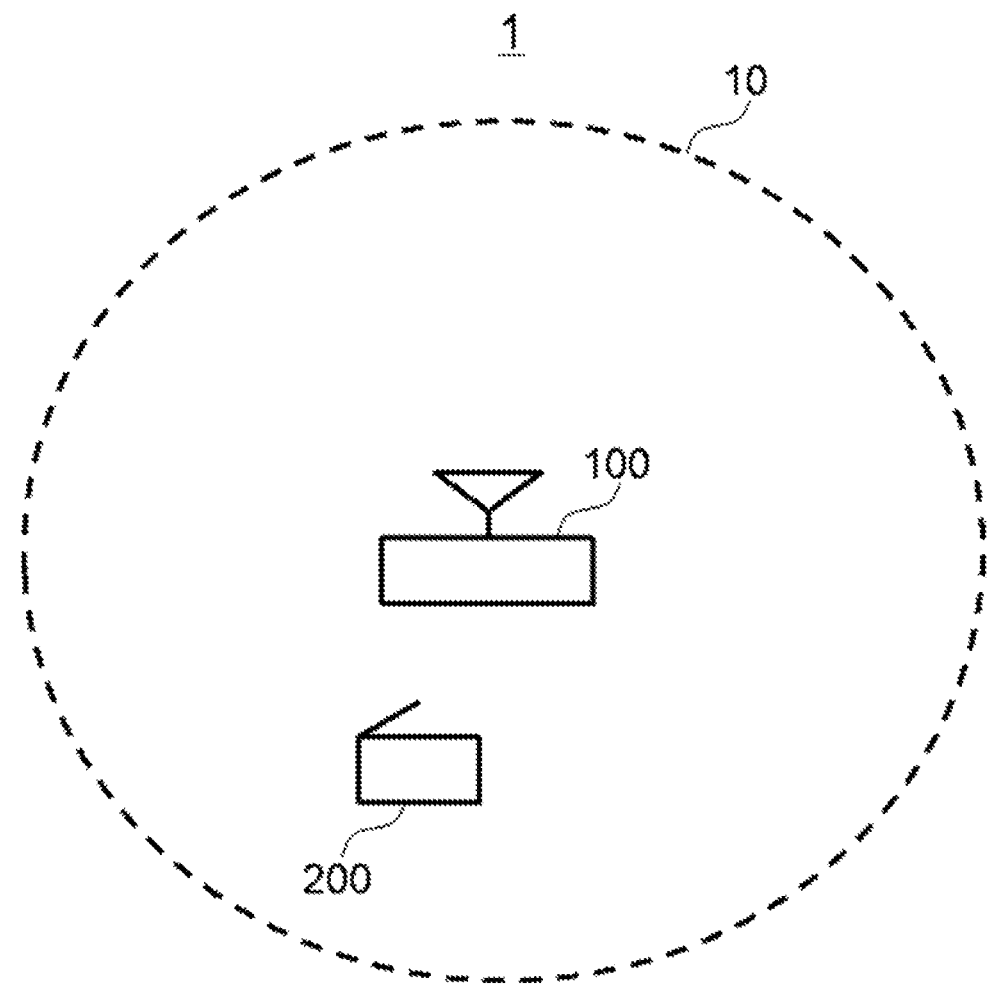
FIG. 4 is an explanatory diagram illustrating an example of a schematic configuration of a system 1 according to example embodiments of the present invention.

With reference to FIG. 4, an example of a configuration of the system 1 according to the example embodiments of the present invention will be described. FIG. 4 is an explanatory diagram illustrating an example of a schematic configuration of the system 1 according to the example embodiments of the present invention. With reference to FIG. 4, the system 1 includes a base station 100 and a terminal apparatus 200.

For example, the system 1 is a system conforming to Third Generation Partnership Project (3GPP) standards/specifications. More specifically, for example, the system 1 may be a system conforming to LTE/LTE-Advanced and/or System Architecture Evolution (SAE) standards/specifications. Alternatively, the system 1 may be a system conforming to fifth-generation (5G)/New Radio (NR) standards/specifications. The system 1 is, of course, not limited to these examples.

(1) Base Station 100

The base station 100 is a radio access network (RAN) node and is configured to perform wireless communication with terminal apparatuses (e.g., the terminal apparatus 200), located in a coverage area 10.

For example, the base station 100 may be an evolved Node B (eNB) or may be a generation Node B (gNB) in 5G. The base station 100 may include a plurality of units (or a plurality of nodes). The plurality of units (or the plurality of nodes) may include a first unit (or a first node) configured to perform upper protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Terminal Apparatus 200

The terminal apparatus 200 performs wireless communication with a base station. For example, when the terminal apparatus 200 is located in the coverage area 10 of the base station 100, the terminal apparatus 200 performs wireless communication with the base station 100. For example, the terminal apparatus 200 is user equipment (UE).

3. First Example Embodiment

Figure 5:
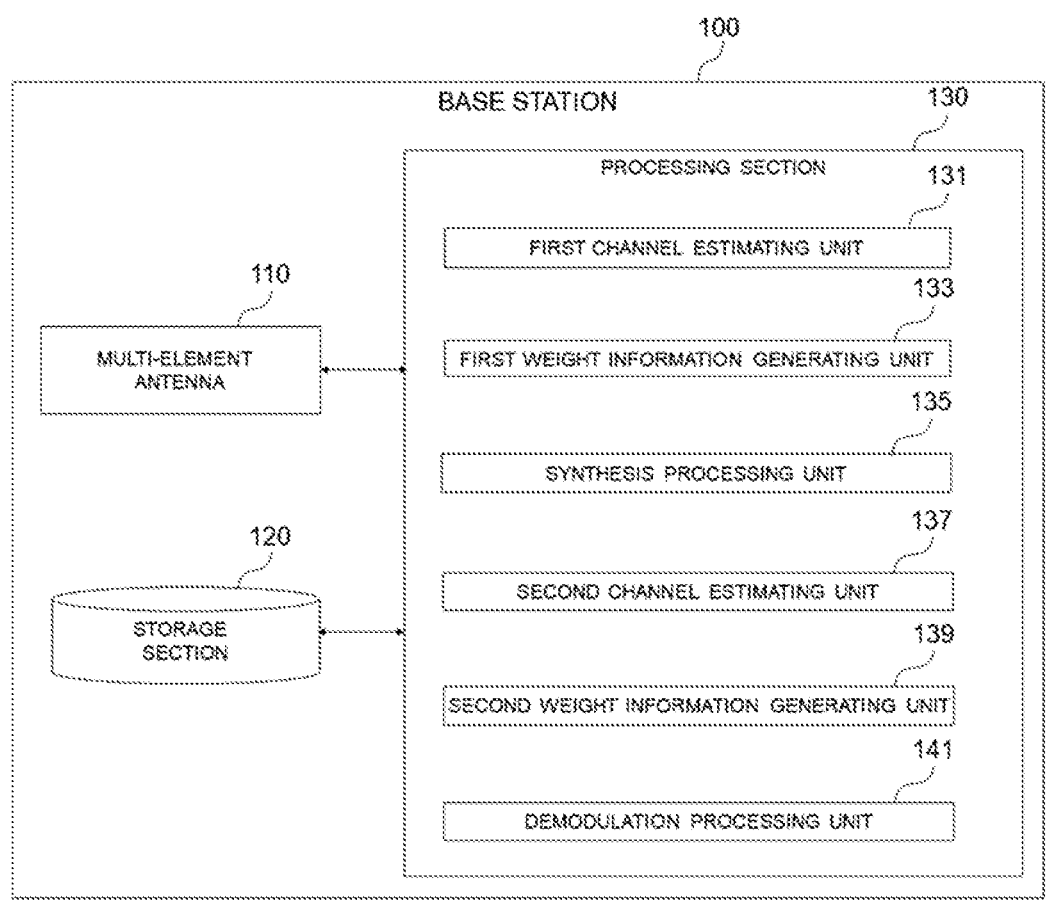
FIG. 5 is a block diagram illustrating an example of a schematic configuration of a base station 100 according to a first example embodiment.
Figure 6:
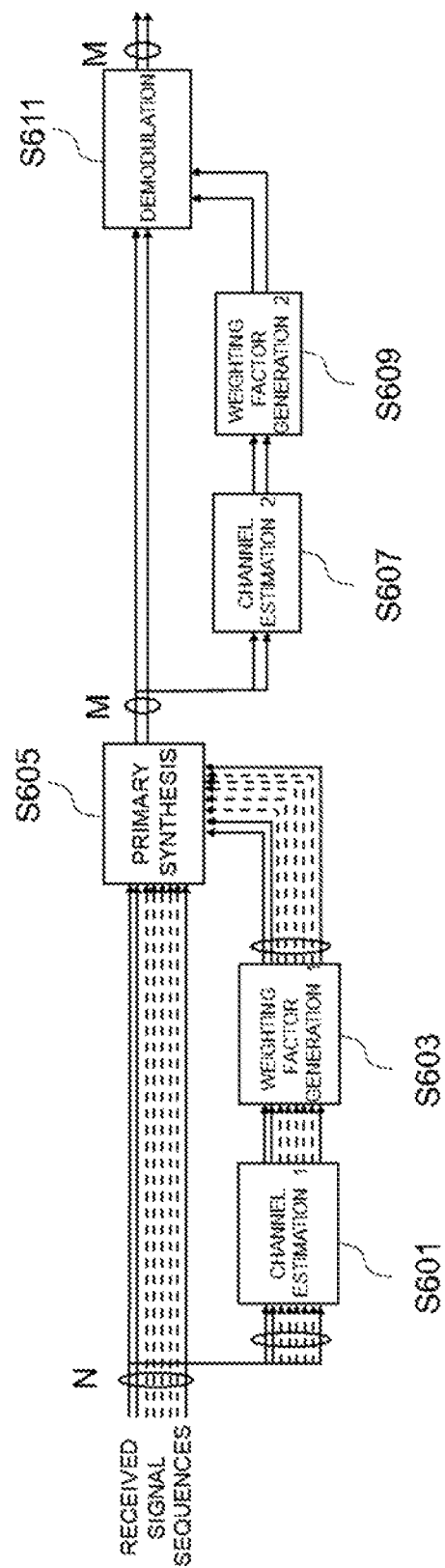
FIG. 6 is an explanatory diagram for schematically illustrating a process of signal processing.

Next, a description will be given of a first example embodiment of the present invention with reference to FIGS. 5 and 6.

3.1. Configuration of Base Station

Next, with reference to FIG. 5, a description will be given of an example of a configuration of a base station 100 according to the first example embodiment. FIG. 5 is a block diagram illustrating an example of a schematic configuration of the base station 100 according to the first example embodiment. With reference to FIG. 5, the base station 100 includes a multi-element antenna 110, a storage section 120, and a processing section 130.

(1) Multi-Element Antenna 110

The multi-element antenna 110 includes a plurality of antenna elements and configured to transmit and receive a signal wirelessly. For example, the multi-element antenna 110 receives a signal from a terminal apparatus and transmits a signal to the terminal apparatus.

(2) Storage Section 120

The storage section 120 temporarily or permanently stores programs (instructions) and parameters for operations of the base station 100 as well as various data. The program includes one or more instructions for operations of the base station 100.

(3) Processing Section 130

The processing section 130 provides various functions of the base station 100. The processing section 130 includes a first channel estimating unit 131, a first weight information generating unit 133, a synthesis processing unit 135, a second channel estimating unit 137, a second weight information generating unit 139, and a demodulation processing unit 141. Note that the processing section 130 may further include constituent elements other than these constituent elements. In other words, the processing section 130 may also perform operations other than the operations of these constituent elements. Concrete operations of the first channel estimating unit 131, the first weight information generating unit 133, the synthesis processing unit 135, the second channel estimating unit 137, the second weight information generating unit 139, and the demodulation processing unit 141 will be described later in detail.

3.2. Technical Features

Next, technical features of the first example embodiment will be described.

The base station 100 (first channel estimating unit 131) performs a first channel estimation at a first frequency using a reference signal included in a signal sequence spatially multiplexed and transmitted. The base station 100 (first weight information generating unit 133) generates first weight information, based on the first channel estimation. The base station 100 (synthesis processing unit 135) performs weighted synthesis processing on the signal sequence, based on the first weight information. The base station 100 (second channel estimating unit 137) performs a second channel estimation at a second frequency higher than the first frequency using a reference signal included in the signal sequence subjected to the weighted synthesis. The base station 100 (second weight information generating unit 139) generates second weight information, based on the second channel estimation. The base station 100 (demodulation processing unit 141) performs demodulation processing of the signal sequence subjected to the weighted synthesis processing, based on the second weight information.

(1) Signal Sequence

The signal sequence is concretely a signal sequence spatially multiplexed and transmitted from the terminal apparatus 200 in an uplink. The signal sequence is received by the multi-element antenna 110.

Reference Signal

As described above, a reference signal is included in the signal sequence. Here, the reference signal is, for example, a demonstration-reference signal (DM-RS), a phase tracking-reference signal (PT-RS), and the like. The DM-RS is mapped to, for example, one symbol or several symbols per subframe constituted of a dozen of symbols. The PT-RS is mapped to one symbol per symbol or several symbols.

(2) First Channel Estimation

The base station 100 (first channel estimating unit 131) performs the first channel estimation at the first frequency using the DM-RS included in the signal sequence, for example.

Here, the first frequency is assumed to be, for example, approximately one tenth of that of demodulation processing. Specifically, the first frequency is a frequency determined using the number of subframes, such as every subframe to every several subframes. In other words, the base station 100 (first channel estimating unit 131) performs the first channel estimation at each period of one or more subframes using the DM-RS.

(3) Second Channel Estimation

For example, the base station 100 (second channel estimating unit 137) performs the second channel estimation at the second frequency using the phase tracking-reference signal (PT-RS) included in the signal sequence subjected to the weighted synthesis processing.

Here, the second frequency is, for example, approximately the same frequency as that of the demodulation processing. Specifically, the second frequency is a frequency determined using the number of symbols, such as every symbol to every several symbols. In other words, the second channel estimating unit 137 performs the second channel estimation at each period of one or more symbols using the PT-RS included in the signal sequence spatially multiplexed and transmitted from the terminal apparatus 200 in the uplink and subjected to the weighted synthesis processing.

Note that the second channel estimating unit 137 may perform the second channel estimation at the second frequency using, for example, a DM-RS, instead of the PT-RS. For example, when the first channel estimation is performed by using a DM-RS every several subframes, the base station 100 (second channel estimating unit 137) may periodically perform the second channel estimation using the DM-RS every subframe, for example.

3.3. Example

Next, with reference to FIG. 6, a description will be given of an example according to the first example embodiment. FIG. 6 is an explanatory diagram for schematically illustrating a process of signal processing.

Configuration of Example

First, assume that the number of layers of a signal spatially multiplexed in MIMO is M (M is a natural number) and the number of antennas of the multi-element antenna 110 is N (N is a natural number).

In step S601, each signal sequence of N systems received by the multi-element antenna 110 is input to the first channel estimating unit 131. As a result, N channel estimated values are calculated for each layer, and a channel estimated value matrix of N rows and M columns in total is calculated.

In step S603, the channel estimated value matrix output from the first channel estimating unit 131 is input to the first weight information generating unit 133. In this way, a weighting factor matrix of M rows and N columns for performing layer separation by MIMO equalization is generated.

Here, for example, when the input channel estimated value matrix of N rows and M columns is denoted by H, the first weight information generating unit 133 can calculate weighting factors W according to the minimum mean square error (MMSE) criterion as in the following equation.

$$W = (H^H H + \sigma^2 I)^{-1} H^H$$

Here, the subscript "H" represents Hermitian conjugate.

In step S605, while the received signal sequences of N systems are input to the first channel estimating unit 131, the signal sequences are also input to the synthesis processing unit 135. The received signal sequences of N systems are multiplied, as signals of N rows, by a weighting factor matrix of M rows and N columns output from the first weight information generating unit 133, through synthesis processing (primary synthesis) by the synthesis processing unit 135. As a result, separated synthesized signal sequences of M systems constituted of signals of M rows are obtained.

In step S607, the separated synthesized signal sequences of M systems are input to the second channel estimating unit 137. As a result, one channel estimated value is calculated per system, and M channel estimated values are calculated in total.

In step S609, the M channel estimated values are input to the second weight information generating unit 139. As a result, M weighting factors for correcting phase variation are generated.

Here, when each of the input channel estimated values of M rows is assumed to be denoted by $h_m$ (m=1, 2, ..., M), the second weight information generating unit 139 can calculate weighting factors $w_m$ as in the following equation.

$$w_m = h_m^{-1}$$

While the separated synthesized signal sequences of M systems are input to the second channel estimating unit 137, the signal sequences are also input to the demodulation processing unit 141. The separated synthesized signal sequences of M systems are then multiplexed by the M respective weighting factors. As a result, demodulated signal sequences of M systems are obtained.

Operations of Example

Next, operations of the example will be described. First, a period of receiving a received signal sequence is assumed to be T.

First, the first channel estimating unit 131 performs a first channel estimation at a period nT (n is an integer greater than 1) using a reference signal included in a received signal sequence. The first weight information generating unit 133 also generates a first weighting factor at the period nT.

A period of the received signal sequence input to the synthesis processing unit 135 is T. This period is longer than the above-described operation period nT of the first weight information generating unit 133. Hence, until new first weighting factors are generated by the first weight information generating unit 133, the synthesis processing unit 135 only needs to perform weighted synthesis processing using the latest first weighting factors. A synthesized signal sequence synthesized by the synthesis processing unit 135 is output at the period T.

The second channel estimating unit 137 performs a second channel estimation at a period mT (m is an integer greater than 1 and smaller than n) using a reference signal included in the synthesized signal sequence. The second weight information generating unit 139 also generates a second weighting factor at the period mT.

The period of the received signal sequence input to the demodulation processing unit 141 is T. This period is longer than the above-described period mT of the second weighting factor circuit output of the second weight information generating unit 139. Hence, until new second weighting factors are generated by the second weight information generating unit 139, the demodulation processing unit 141 simply needs to perform demodulation processing using the latest second weighting factor. The demodulation signal sequence demodulated by the demodulation processing unit 141 is output at the period T.

Advantageous Effects

As a comparison example for the present example, assume, for example, a case where channel estimation and weighting factor generation for N rows and M columns are performed on received signals of N systems at the period mT. In such a comparison example, the number of times of channel estimation and weighting factor generation performed per period T is MN/m times.

In contrast, according to the above-described example, since the period of channel estimation and weighting factor generation for N rows and M columns for received signals of N systems is nT, and the period of channel estimation and weighting factor generation for synthesized signals of M systems is mT, the number of times of channel estimation and weighting factor generation performed per period T is (MN/n+M/m).

As a concrete example, in a case assuming that the period nT is approximately ten times longer than the period mT, that the number of layers M is four, and that the number of antennas N is approximately 640, the number of times of channel estimation and weighting factor generation in the above-described example is 0.116(1/10+1/64) compared to the above-described comparison example. In this way, it is possible to achieve a significant reduction in circuit scale.

Here, although variation due to fading needs to be corrected at the time of MIMO reception, the variation is assumed to be low-speed variation according to the moving speed of a terminal apparatus. In contrast, variation due to frequency errors and the like is assumed to be high-speed variation.

In view of these, as described above, reception demodulation processing is performed on each of the signal sequences spatially multiplexed and transmitted from the terminal apparatus 200 in two stages in the present example. Specifically, it is possible to first perform MIMO equalization reception at low frequency on each of a number of received signal sequences received by the multi-element antenna 110 to perform spatial separation corresponding to low-speed fading while synthesizing the received signal sequences to thereby limit the number of signal sequences, and to subsequently perform demodulation processing corresponding to high-speed phase variation at a high frequency on each of the spatially separated signal sequences. With this, it is possible to efficiently demodulate each spatially multiplexed signal sequence while attempting a reduction in circuit scale.

Example Alterations

For example, the first weighting factor generation processing is more complex than the second weighting factor generation processing, which also requires a large amount of calculation. For this reason, even in a case of not using a multi-element antenna, it is possible to achieve a reduction in circuit scale as described above. Specifically, even in a case of N=M, it is possible to perform MIMO reception efficiently.

4. Second Example Embodiment

Figure 7:
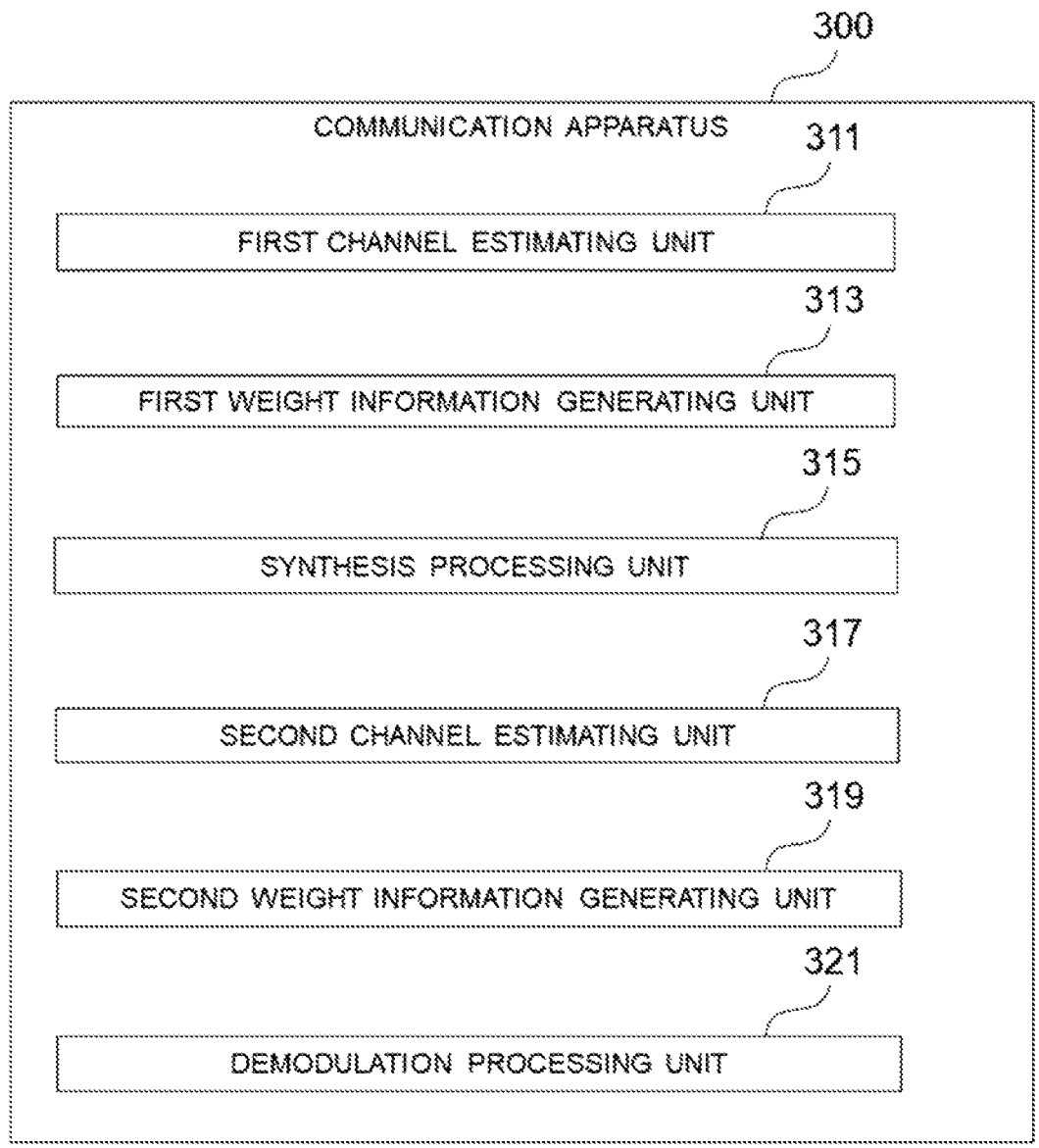
FIG. 7 is a block diagram illustrating an example of a schematic configuration of a communication apparatus 300 according to a second example embodiment.

Next, a description will be given of a second example embodiment of the present invention with reference to FIG. 7. The above-described first example embodiment is a concrete example embodiment, whereas the second example embodiment is a more generalized example embodiment.

4.1. Configuration of Communication Apparatus

First, with reference to FIG. 7, an example of a configuration of a communication apparatus 300 according to the second example embodiment will be described. FIG. 7 is a block diagram illustrating an example of a schematic configuration of the communication apparatus 300 according to the second example embodiment. With reference to FIG. 7, the communication apparatus 300 includes a first channel estimating unit 311, a first weight information generating unit 313, a synthesis processing unit 315, a second channel estimating unit 317, a second weight information generating unit 319, and a demodulation processing unit 321. Concrete operations of the first channel estimating unit 311, the first weight information generating unit 313, the synthesis processing unit 315, the second channel estimating unit 317, the second weight information generating unit 319, and the demodulation processing unit 321 will be described later.

The first channel estimating unit 311, the first weight information generating unit 313, the synthesis processing unit 315, the second channel estimating unit 317, the second weight information generating unit 319, and the demodulation processing unit 321 may be implemented with the same processor or may be implemented with separate processors. The first channel estimating unit 311, the first weight information generating unit 313, the synthesis processing unit 315, the second channel estimating unit 317, the second weight information generating unit 319, and the demodulation processing unit 321 may include a memory configured to store a program (instructions) and one or more processors that can execute the program (instructions), and the one or more processors may perform operations of the first channel estimating unit 311, the first weight information generating unit 313, the synthesis processing unit 315, the second channel estimating unit 317, the second weight information generating unit 319, and the demodulation processing unit 321. The program may be a program for causing the processor(s) to execute operations of the first channel estimating unit 311, the first weight information generating unit 313, the synthesis processing unit 315, the second channel estimating unit 317, the second weight information generating unit 319, and the demodulation processing unit 321.

4.2. Technical Features

Next, technical features of the second example embodiment will be described.

In the second example embodiment, the communication apparatus 300 (first channel estimating unit 311) performs a first channel estimation at a first frequency using a reference signal included in a signal sequence spatially multiplexed and transmitted. The communication apparatus 300 (first weight information generating unit 313) generates first weight information, based on the first channel estimation. The communication apparatus 300 (synthesis processing unit 315) performs weighted synthesis processing based on the first weight information, on the signal sequence. The communication apparatus 300 (second channel estimating unit 317) performs a second channel estimation at a second frequency higher than the first frequency using a reference signal included in the signal sequence subjected to the weighted synthesis. The communication apparatus 300 (second weight information generating unit 319) generates second weight information based on the second channel estimation. The communication apparatus 300 (demodulation processing unit 321) performs demodulation processing of the signal sequence subjected to the weighted synthesis processing, based on the second weight information.

For example, the communication apparatus 300 may perform the operations of the base station 100 according to the first example embodiment. The communication apparatus 300 is also applicable to downlink reception. Specifically, the communication apparatus 300 may be used for the demodulation processing of the terminal apparatus 200 according to the first example embodiment.

The second example embodiment has been described above. According to the second example embodiment, it is possible, for example, to efficiently demodulate a spatially multiplexed signal sequence while attempting a reduction in circuit scale.

5. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

An apparatus including constituent elements (e.g., the first channel estimating unit, the first weight information generating unit, the synthesis processing unit, the second channel estimating unit, the second weight information generating unit, and/or the demodulation processing unit) of the communication apparatus described in the Specification (e.g., one or more apparatuses (or units) among a plurality of apparatuses (or units) constituting the base station or the terminal apparatus, or a module for one of the plurality of apparatuses (or units)) may be provided. Moreover, methods including processing of the constituent elements may be provided, and programs for causing a processor to execute processing of the constituent elements may be provided. Moreover, non-transitory computer-readable recording media (non-transitory computer readable media) having recorded thereon the programs may be provided. It is apparent that such apparatuses, modules, methods, programs, and non-transitory computer-readable recording media are also included in the present invention.

The whole or part of the example embodiments disclosed above can be described as, but not limited to, the following supplementary notes.

(Supplementary Note 1)

A communication apparatus comprising:

a first channel estimating unit configured to perform a first channel estimation at a first frequency using a reference signal included in a spatially multiplexed and transmitted signal sequence;

a first weight information generating unit configured to generate first weight information based on the first channel estimation;

a synthesis processing unit configured to perform weighted synthesis processing on the signal sequence based on the first weight information;

a second channel estimating unit configured to perform a second channel estimation at a second frequency higher than the first frequency using a reference signal included in the signal sequence subjected to the weighted synthesis processing;

a second weight information generating unit configured to generate second weight information based on the second channel estimation; and a demodulation processing unit configured to perform demodulation processing of the signal sequence subjected to the weighted synthesis processing based on the second weight information.

(Supplementary Note 2)

The communication apparatus according to supplementary note 1, wherein the signal sequence is a signal sequence spatially multiplexed and transmitted from a terminal apparatus in an uplink.

(Supplementary Note 3)

The communication apparatus according to supplementary note 2, wherein the first channel estimating unit is configured to perform the first channel estimation at the first frequency using a Demonstration-Reference Signal (DM-RS) included in the signal sequence spatially multiplexed and transmitted from the terminal apparatus in the uplink.

(Supplementary Note 4)

The communication apparatus according to supplementary note 3, wherein the first channel estimating unit is configured to perform the first channel estimation at each period of one or more subframes using the Demonstration-Reference Signal (DM-RS) included in the signal sequence spatially multiplexed and transmitted from the terminal apparatus in the uplink.

(Supplementary Note 5)

The communication apparatus according to any one of supplementary notes 2 to 4, wherein the second channel estimating unit is configured to perform the second channel estimation at the second frequency using a Phase Tracking-Reference Signal (PT-RS) included in a signal sequence, spatially multiplexed and transmitted from the terminal apparatus in the uplink, and subjected to the weighted synthesis processing.

(Supplementary Note 6)

The communication apparatus according to supplementary note 5, wherein the second channel estimating unit is configured to perform the second channel estimation at each period of one or more symbol using a Phase Tracking-Reference Signal (PT-RS) included in the signal sequence, spatially multiplexed and transmitted from the terminal apparatus in the uplink, and subjected to the weighted synthesis processing.

(Supplementary Note 7)

The communication apparatus according to any one of supplementary notes 2 to 4, wherein the second channel estimating unit is configured to perform the second channel estimation at the second frequency using a Demonstration-Reference Signal (DM-RS) included in a signal sequence, spatially multiplexed and transmitted from the terminal apparatus in the uplink, and subjected to the weighted synthesis processing.

(Supplementary Note 8)

A method comprising:

performing a first channel estimation at a first frequency using a reference signal included in a spatially multiplexed and transmitted signal sequence;

generating first weight information based on the first channel estimation;

performing weighted synthesis processing on the signal sequence based on the first weight information;

performing a second channel estimation at a second frequency higher than the first frequency using a reference signal included in the signal sequence subjected to the weighted synthesis processing;

generating second weight information based on the second channel estimation; and performing demodulation processing of the signal sequence subjected to the weighted synthesis processing based on the second weight information.

(Supplementary Note 9)

A program that causes a processor to execute:

performing a first channel estimation at a first frequency using a reference signal included in a spatially multiplexed and transmitted signal sequence;

generating first weight information based on the first channel estimation;

performing weighted synthesis processing on the signal sequence based on the first weight information;

performing a second channel estimation at a second frequency higher than the first frequency using a reference signal included in the signal sequence subjected to the weighted synthesis processing;

generating second weight information based on the second channel estimation; and performing demodulation processing of the signal sequence subjected to the weighted synthesis processing based on the second weight information.

(Supplementary Note 10)

A non-transitory computer readable recording medium storing a program that causes a processor to execute:

performing a first channel estimation at a first frequency using a reference signal included in a spatially multiplexed and transmitted signal sequence;

generating first weight information based on the first channel estimation;

performing weighted synthesis processing on the signal sequence based on the first weight information;

performing a second channel estimation at a second frequency higher than the first frequency using a reference signal included in the signal sequence subjected to the weighted synthesis processing;

generating second weight information based on the second channel estimation; and performing demodulation processing of the signal sequence subjected to the weighted synthesis processing based on the second weight information.

INDUSTRIAL APPLICABILITY

In a mobile communication system, it is possible to efficiently demodulate a spatially multiplexed signal sequence while attempting a reduction in circuit scale.

REFERENCE SIGNS LIST

1 System
100 Base Station
131, 311 First Channel Estimating Unit
133, 313 First Weight Information Generating Unit
135, 315 Synthesis Processing Unit
137, 317 Second Channel Estimating Unit
139, 319 Second Weight Information Generating Unit
141, 321 Demodulation Processing Unit
200 Terminal Apparatus
300 Communication Apparatus

What is claimed is:

1. A communication apparatus comprising:
a memory storing instructions; and
one or more processors configured to execute the instructions to:
perform a first channel estimation at a first frequency using a reference signal included in a spatially multiplexed and transmitted signal sequence;
generate first weight information based on the first channel estimation;

perform weighted synthesis processing on the signal sequence based on the first weight information;

perform a second channel estimation at a second frequency higher than the first frequency using a reference signal included in the signal sequence subjected to the weighted synthesis processing;

generate second weight information based on the second channel estimation; and perform demodulation processing of the signal sequence subjected to the weighted synthesis processing based on the second weight information.

2. The communication apparatus according to claim 1, wherein the signal sequence is a signal sequence spatially multiplexed and transmitted from a terminal apparatus in an uplink.

3. The communication apparatus according to claim 2, wherein the first channel estimation at the first frequency is performed using a Demonstration-Reference Signal (DM-RS) included in the signal sequence spatially multiplexed and transmitted from the terminal apparatus in the uplink.

4. The communication apparatus according to claim 3, the first channel estimation at each period of one or more subframes is performed using the Demonstration-Reference Signal (DM-RS) included in the signal sequence spatially multiplexed and transmitted from the terminal apparatus in the uplink.

5. The communication apparatus according to claim 2, wherein the second channel estimation at the second frequency is performed using a Phase Tracking-Reference Signal (PT-RS) included in a signal sequence, spatially multiplexed and transmitted from the terminal apparatus in the uplink, and subjected to the weighted synthesis processing.

6. The communication apparatus according to claim 5, wherein the second channel estimation at each period of one or more symbol is performed using a Phase Tracking-Reference Signal (PT-RS) included in the signal sequence, spatially multiplexed and transmitted from the terminal apparatus in the uplink, and subjected to the weighted synthesis processing.

7. The communication apparatus according to claim 2, wherein the second channel estimation at the second frequency is performed using a Demonstration-Reference Signal (DM-RS) included in a signal sequence, spatially multiplexed and transmitted from the terminal apparatus in the uplink, and subjected to the weighted synthesis processing.

8. A method comprising:
performing a first channel estimation at a first frequency using a reference signal included in a spatially multiplexed and transmitted signal sequence;

generating first weight information based on the first channel estimation;

performing weighted synthesis processing on the signal sequence based on the first weight information;

performing a second channel estimation at a second frequency higher than the first frequency using a reference signal included in the signal sequence subjected to the weighted synthesis processing;

generating second weight information based on the second channel estimation; and performing demodulation processing of the signal sequence subjected to the weighted synthesis processing based on the second weight information.

9. A non-transitory computer readable recording medium storing a program that causes a processor to execute:
performing a first channel estimation at a first frequency using a reference signal included in a spatially multiplexed and transmitted signal sequence;

generating first weight information based on the first channel estimation;

performing weighted synthesis processing on the signal sequence based on the first weight information;

performing a second channel estimation at a second frequency higher than the first frequency using a reference signal included in the signal sequence subjected to the weighted synthesis processing;

generating second weight information based on the second channel estimation; and performing demodulation processing of the signal sequence subjected to the weighted synthesis processing based on the second weight information.

* * * * *